United States Patent
Horiuchi et al.

(10) Patent No.: US 11,487,327 B2
(45) Date of Patent: Nov. 1, 2022

(54) DISPLAY ASSEMBLY, PORTABLE INFORMATION DEVICE, MANUFACTURING METHOD OF DISPLAY ASSEMBLY, AND MANUFACTURING METHOD OF PORTABLE INFORMATION DEVICE

(71) Applicant: Lenovo (Singapore) Pte. Ltd., Singapore (SG)

(72) Inventors: Shigehiro Horiuchi, Kanagawa (JP); Tatsuya Ushioda, Kanagawa (JP); Hiroaki Kinoshita, Kanagawa (JP); Takehito Yamauchi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/236,180

(22) Filed: Apr. 21, 2021

(65) Prior Publication Data

US 2021/0360800 A1 Nov. 18, 2021

(30) Foreign Application Priority Data

May 13, 2020 (JP) ................................ JP2020-84757

(51) Int. Cl.
*G06F 1/16* (2006.01)

(52) U.S. Cl.
CPC .......... *G06F 1/1637* (2013.01); *G06F 1/1616* (2013.01); *G06F 1/1641* (2013.01)

(58) Field of Classification Search
CPC .... G06F 1/1616; G06F 1/1618; G06F 1/1681; G06F 1/1652; G06F 1/1637;
(Continued)

(56) References Cited

U.S. PATENT DOCUMENTS 10,485,116 B2 * 11/2019 Kim ...................... H05K 5/0017
10,798,831 B2 * 10/2020 Shin ........................ H05K 3/284
(Continued)

FOREIGN PATENT DOCUMENTS

| CN | 111105715 A | 5/2020 |
| EP | 2690521 A1 | 1/2014 |

(Continued)

OTHER PUBLICATIONS

Office Action issued in corresponding Japanese Patent Application No. 2020-084757, dated May 11, 2021 (5 pages).
(Continued)

*Primary Examiner* — Hung S. Bui
*Assistant Examiner* — Sagar Shrestha
(74) *Attorney, Agent, or Firm* — Osha Bergman Watanabe & Burton LLP

(57) ABSTRACT

A display assembly includes: a first plate having a first surface; a second plate having a second surface; and a display formed into one sheet shape and including a first region fixed to the first surface, a second region fixed to the second surface, and a third region as a region between the first region and the second region. The display assembly includes a flat plate form in which the first and second surfaces are lined up in a plane direction to be formed into a flat-plate shape, and a folded form in which the third region is so bent that the surface of the first plate and the surface of the second plate face each other. In the flat plate form, a tension is applied to the third region in a width direction toward the first region and the second region.

7 Claims, 15 Drawing Sheets

(58) Field of Classification Search
CPC .............. G06F 1/1641; G06F 3/0412; G06F 2203/04102; G06F 2203/04103; H05K 5/0017; H04M 1/0216; H04M 1/0268
See application file for complete search history.

(56) References Cited

U.S. PATENT DOCUMENTS

| | | | |
|---|---|---|---|
| 11,031,563 B1* | 6/2021 | Li | H01L 51/0097 |
| 2013/0216740 A1* | 8/2013 | Russell-Clarke | B23K 26/38 |
| | | | 219/121.72 |
| 2014/0029171 A1* | 1/2014 | Lee | H05K 7/16 |
| | | | 361/679.01 |
| 2015/0153780 A1* | 6/2015 | Maatta | G06F 1/1652 |
| | | | 361/679.27 |
| 2016/0048169 A1* | 2/2016 | Yang | H04M 1/0268 |
| | | | 361/749 |
| 2016/0091923 A1* | 3/2016 | Morrison | G06F 1/1681 |
| | | | 345/55 |
| 2016/0302314 A1* | 10/2016 | Bae | G06F 1/1616 |
| 2017/0199547 A1* | 7/2017 | Jeong | G06F 1/1652 |
| 2018/0317333 A1* | 11/2018 | Bi | H05K 5/0226 |
| 2019/0073002 A1* | 3/2019 | Wu | G06F 1/1618 |
| 2019/0132947 A1* | 5/2019 | Koo | H04M 1/0216 |
| 2019/0243424 A1 | 8/2019 | Lee et al. | |
| 2020/0319672 A1* | 10/2020 | Kim | G06F 1/1656 |
| 2020/0326751 A1* | 10/2020 | Kim | G06F 1/1616 |
| 2020/0333835 A1* | 10/2020 | Wi | G06F 3/0482 |
| 2021/0007229 A1* | 1/2021 | Gu | G06F 1/1652 |
| 2021/0165454 A1* | 6/2021 | Dong | B32B 3/266 |
| 2021/0341972 A1* | 11/2021 | Togashi | G06F 1/1652 |
| 2021/0365074 A1* | 11/2021 | Mehandjiysky | G06F 1/1652 |
| 2021/0407339 A1* | 12/2021 | Feng | G06F 1/1652 |
| 2022/0103670 A1* | 3/2022 | Liao | G06F 1/1681 |

FOREIGN PATENT DOCUMENTS

| | | |
|---|---|---|
| EP | 2985671 A1 | 2/2016 |
| EP | 3190455 A2 | 7/2017 |
| JP | 2018112833 A | 7/2018 |
| JP | 2019005296 A | 1/2019 |
| WO | 2017051788 A1 | 3/2017 |
| WO | 2018179309 A1 | 10/2018 |

OTHER PUBLICATIONS

Extended European Search Report issued in corresponding European Patent Application No. 21164581.7 dated Dec. 13, 2021 (34 pages).

* cited by examiner

| WIDTH DIMENSION W1 [mm] | TENSILE AMOUNT [mm] | TENSILE RATIO [%] | EVALUATION |
|---|---|---|---|
| 15 | 0.5 | 3.33 | △ |
| 15 | 0.4 | 2.67 | ○ |
| 15 | 0.3 | 2.00 | ○ |
| 15 | 0.2 | 1.33 | ○ |
| 15 | 0.1 | 0.67 | ◎ |
| 15 | 0.05 | 0.33 | △ |

FIG. 9

DISPLAY ASSEMBLY, PORTABLE INFORMATION DEVICE, MANUFACTURING METHOD OF DISPLAY ASSEMBLY, AND MANUFACTURING METHOD OF PORTABLE INFORMATION DEVICE

TECHNICAL FIELD

The present invention relates to a display assembly, a portable information device, a manufacturing method of the display assembly, and a manufacturing method of the portable information device.

BACKGROUND

In recent years, a portable information device, such as a tablet PC or a smartphone having a touch panel type liquid crystal display and not having a physical keyboard, has rapidly spread. The display of this kind of portable information device has been desired to be large when in use but has been desired to be miniaturized when not in use. Therefore, a portable information device using a flexible display such as organic EL (Electro Luminescence) to make not only a chassis but also the display foldable has been proposed (for example, see Japanese Unexamined Patent Application Publication No. 2018-112833).

The back side of the flexible display may be supported by a hard member when used in a state of being open in a flat-plate shape. Therefore, in the configuration disclosed in Japanese Unexamined Patent Application Publication No. 2018-112833 mentioned above, the display is pasted over the surfaces of a pair of right and left plates.

In this case, there is a need to leave an actually bending part (bending region) of the display free without being fixed to the plates to enable the bending motion. As a result, a protruding wrinkle occurs in the bending region of the display when used in the state of being open in the flat-plate shape, and this causes the deterioration of visibility and appearance quality.

SUMMARY

One or more embodiments of the present invention provide a display assembly, a portable information device, a manufacturing method of the display assembly, and a manufacturing method of the portable information device, capable of suppressing the occurrence of wrinkles in a display having a bendable region.

A display assembly according to one or more embodiments of the present invention includes: a first plate; a second plate provided adjacent to the first plate; and a display formed into one sheet shape and having a first region fixed to the surface of the first plate, a second region fixed to the surface of the second plate, and a third region as a region between the first region and the second region, which is provided to straddle adjacent end faces of the first plate and the second plate and to be bendable without being fixed to the surfaces of the first plate and the second plate, wherein the display assembly has a flat plate form in which the surfaces of the first plate and the second plate are lined up in a plane direction to be formed into a flat-plate shape, and a folded form in which the third region is so bent that the surface of the first plate and the surface of the second plate face each other, and in the flat plate form, a tension is applied to the third region in a width direction toward the first region and the second region.

The third region may also be such that the dimension in the width direction in a state of being applied with the tension is stretched by 0.3% or more with respect to the dimension in a state of being not applied with the tension.

The third region may further be such that the dimension in the width direction in the state of being applied with the tension is stretched in a range of less than 3.3% with respect to the dimension in the state of being not applied with the tension.

The display assembly may also be such that a sheet-shaped member with a plurality of holes formed is provided on the back surface of the display, and the sheet-shaped member is so formed that an opening ratio of the holes in the third region is larger than an opening ratio of the holes in the first region and the second region.

The display assembly may further be such that the adjacent end faces of the first plate and the second plate come into contact with each other in the flat plate form.

A portable information device according to one or more embodiments of the present invention includes: a first chassis; a second chassis coupled to the first chassis to be rotatable relative to the first chassis; a first plate fixed to the first chassis; a second plate fixed to the first chassis and provided adjacent to the first plate; and a display formed into one sheet shape and having a first region fixed to the surface of the first plate, a second region fixed to the surface of the second plate, and a third region as a region between the first region and the second region, which is provided to straddle adjacent end faces of the first plate and the second plate and to be bendable without being fixed to the surfaces of the first plate and the second plate, wherein the portable information device has a flat plate form in which the first chassis and the second chassis are lined up in a plane direction to be formed into a flat-plate shape, and a folded form in which the third region is so bent that the surface of the first plate and the surface of the second plate face each other, and in the flat plate form, a tension is applied to the third region in a width direction toward the first region and the second region.

The third region may also be such that the dimension in the width direction in a state of being applied with the tension is stretched by 0.3% or more with respect to the dimension in a state of being not applied with the tension.

The portable information device may also be such that the adjacent end faces of the first plate and the second plate come into contact with each other in the flat plate form.

The portable information device may further be such that the adjacent end faces of the first plate and the second plate are separated from each other in the flat plate form.

A manufacturing method of a display assembly according to one or more embodiments of the present invention includes: a first process of setting a first plate and a second plate on a jig in a state of being adjacent to each other to retain the surfaces of the first plate and the second plate in an angular posture of less than 180 degrees; and a second process of fixing a first region of a display, formed into one sheet shape, to the surface of the first plate, and fixing a second region of the display to the surface of the second plate, where a third region between the first region and the second region of the display is disposed in a position to straddle adjacent end faces of the first plate and the second plate without being fixed to the surfaces of the first plate and the second plate.

The second process may also be such that, in a state where the surfaces of the first plate and the second plate set on the jig are oriented downward, the display is moved from down to up to fix the display to the first plate and the second plate.

A manufacturing method of a portable information device according to one or more embodiments of the present invention includes: a first process of setting a first plate and a second plate on a jig in a state of being adjacent to each other to retain the surfaces of the first plate and the second plate in an angular posture of less than 180 degrees; a second process of fixing a first region of a display, formed into one sheet shape, to the surface of the first plate, and fixing a second region of the display to the surface of the second plate, where a third region between the first region and the second region of the display is disposed in a position to straddle adjacent end faces of the first plate and the second plate without being fixed to the surfaces of the first plate and the second plate to form a display assembly with the display fixed to the first plate and the second plate; and a third process of attaching the first plate of the display assembly to a first chassis, and attaching the second plate to a second chassis adjacent to the first chassis and coupled rotatably to the first chassis.

A manufacturing method of a portable information device according to one or more embodiments of the present invention includes: a first process of fixing a first region of a display, formed into one sheet shape, to the surface of a first plate, and fixing a second region of the display to the surface of a second plate adjacent to the first plate, where a third region between the first region and the second region of the display is disposed in a position to straddle adjacent end faces of the first plate and the second plate without being fixed to the surfaces of the first plate and the second plate; and a second process of attaching the first plate to a first chassis and attaching the second plate to a second chassis adjacent to the first chassis and coupled rotatably to the first chassis, wherein the second process is to attach the second plate to the second chassis in a state of applying, to the third region, a tension in a width direction toward the first region and the second region after attaching the first plate to the first chassis.

One or more embodiments of the present invention can suppress the occurrence of wrinkles in the display having a bendable region.

BRIEF DESCRIPTION OF THE DRAWINGS

FIG. 9 is a table of experimental data indicative of evaluation results when the width dimension of a bending region in the flat plate form, the tensile amount, and the tensile ratio are changed.

DETAILED DESCRIPTION

A display assembly and a portable information device according to one or more embodiments of the present invention will be described in detail below by illustrating manufacturing methods thereof and citing embodiments with reference to the accompanying drawings.

Figure 1:
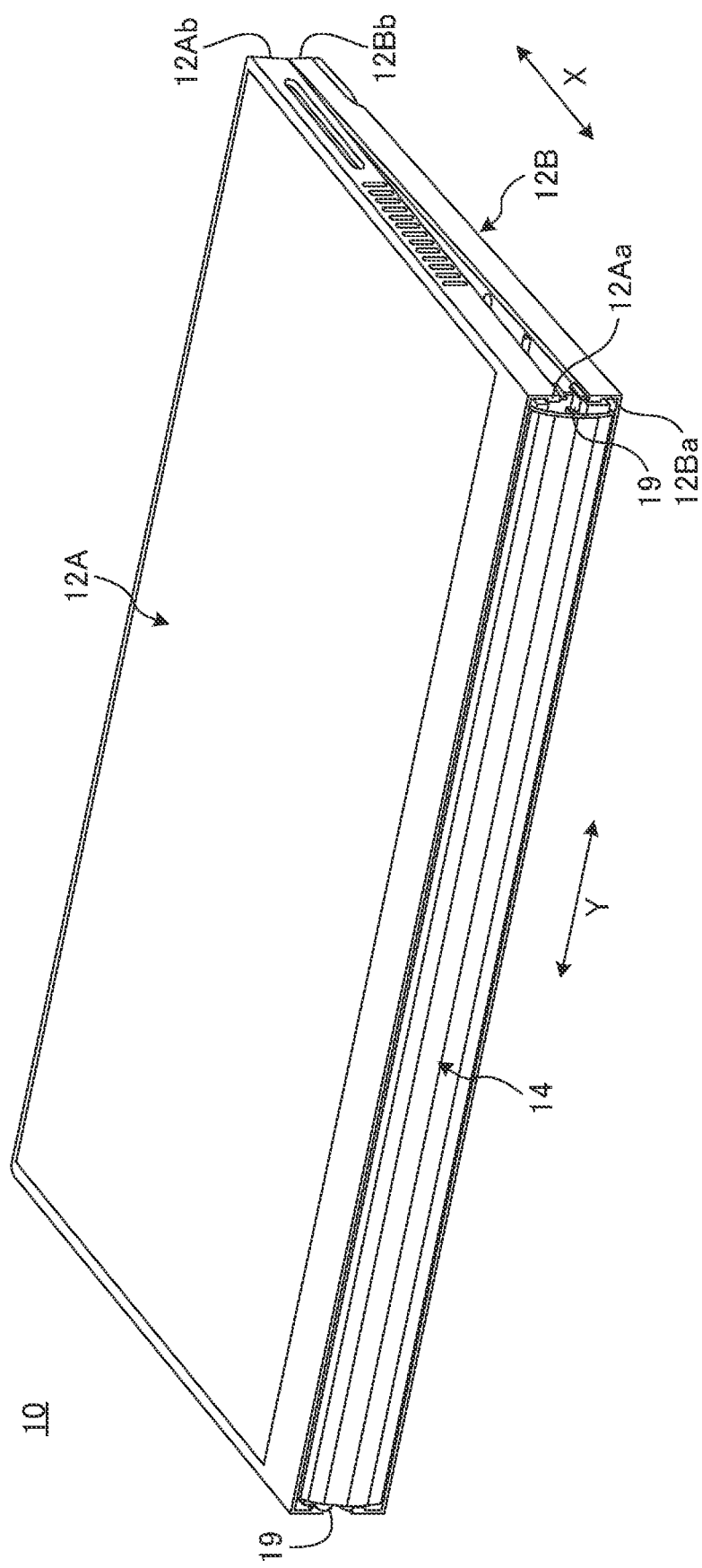
FIG. 1 is a perspective view illustrating a state where a portable information device according to one or more embodiments is closed and shaped into a folded form.
Figure 2:
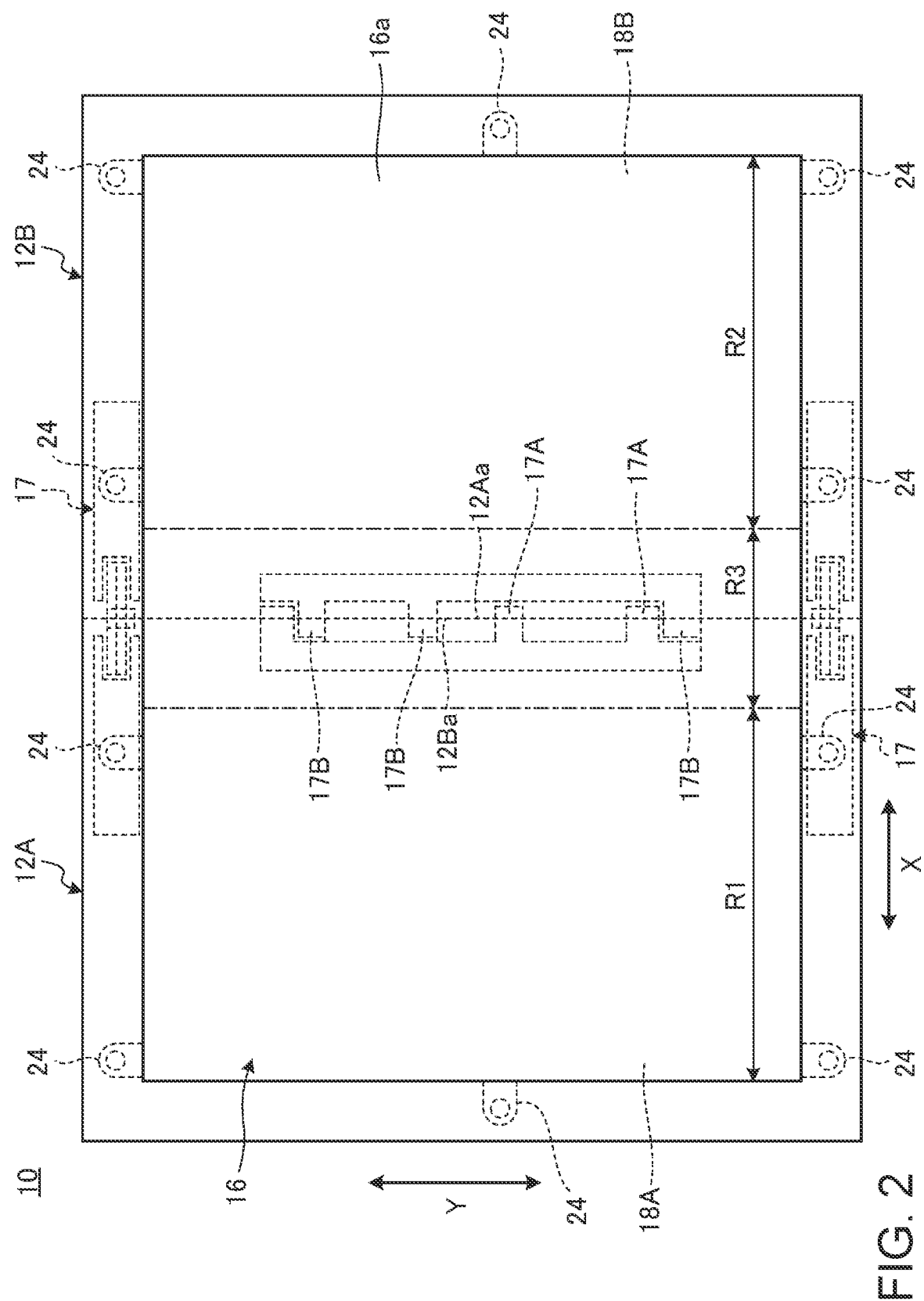
FIG. 2 is a plan view schematically illustrating a state where the portable information device illustrated in FIG. 1 is opened and shaped into a flat plate form.

FIG. 1 is a perspective view illustrating a state where a portable information device 10 according to one or more embodiments is closed and shaped into a folded form. FIG. 2 is a plan view schematically illustrating a state where the portable information device 10 illustrated in FIG. 1 is opened and shaped into a flat plate form.

As illustrated in FIG. 1 and FIG. 2, the portable information device 10 includes a first chassis 12A and a second chassis 12B, a spine member 14, and a display assembly 16. The portable information device 10 according to one or more embodiments is a tablet PC foldable like a book. The portable information device 10 may be a cellular phone, a smartphone, a portable game machine, or the like.

The chassis 12A and 12B are disposed adjacent to each other. Each of the chassis 12A and 12B is formed into a rectangular plate-shaped member with side walls standing on three sides except the side (adjacent edge 12Aa, 12Ba) corresponding to the spine member 14, respectively. Each of the chassis 12A and 12B is formed from a metal plate made of stainless steel, magnesium, aluminum, or the like, or formed from a fiber-reinforced plastic plate containing reinforcing fiber such as carbon fiber. The spine member 14 is a member to hide a gap between adjacent edges 12Aa and 12Ba formed in the folded form illustrated in FIG. 1. The display assembly 16 extends across the chassis 12A and 12B.

As illustrated in FIG. 1 and FIG. 2, the portable information device 10 will be described below by expressing a line-up direction of the chassis 12A and 12B as an X direction and a direction orthogonal to the line-up direction along the adjacent edges 12Aa and 12Ba as a Y direction.

The adjacent edges 12Aa and 12Ba of the chassis 12A and 12B are coupled to each other through a pair of hinges 17, 17. The chassis 12A and 12B are coupled by the hinges 17 to be rotatable relatively between the folded form illustrated in FIG. 1 and the flat plate form illustrated in FIG. 2. The hinges 17 are arranged, for example, in both end portions of the adjacent edges 12Aa and 12Ba of the chassis 12A and 12B in the Y direction, and located outside of an outer peripheral edge of the display assembly 16, respectively. The portable information device 10 of one or more embodiments is so set that the rotating center between the chassis 12A and 12B by the hinges 17 matches a surface 16a of the display assembly 16 (see FIG. 3).

On the inner surfaces of the respective chassis 12A and 12B, various electronic components such as a motherboard, various semiconductor chips like a CPU mounted on the motherboard, a communication module, a battery device, and a cooling device are mounted and fixed.

Figure 3:
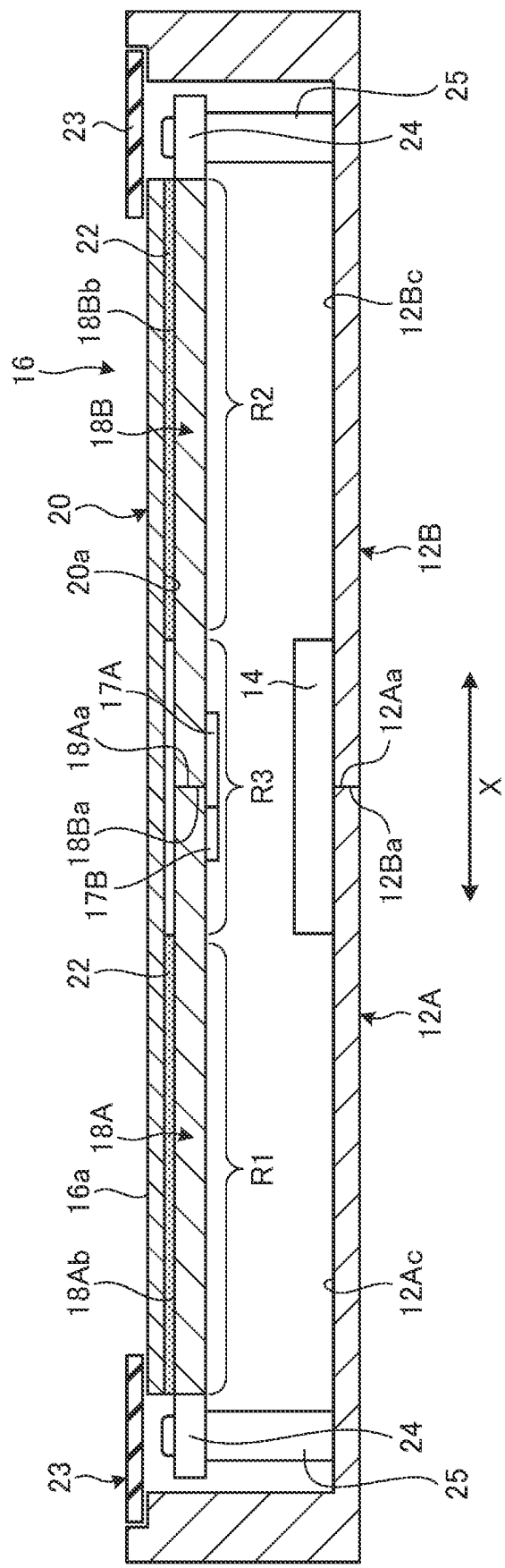
FIG. 3 is a side sectional view schematically illustrating the internal structure of the portable information device illustrated in FIG. 2.

FIG. 3 is a side sectional view schematically illustrating the internal structure of the portable information device 10 illustrated in FIG. 2. As illustrated in FIG. 3, the display assembly 16 includes a first plate 18A and a second plate 18B, and a display 20 supported by the plates 18A and 18B.

The first plate 18A and the second plate 18B support the display 20 on surfaces 18Ab and 18Bb thereof. The plates 18A and 18B are thin and hard plate-shaped members. A back surface 20a of the display 20 is pasted on the surfaces 18Ab and 18Bb of the plates 18A and 18B by using adhesive members 22. The plates 18A and 18B of one or more embodiments are fiber-reinforced plastic plates containing carbon fiber or the like. The plates 18A and 18B may also be formed from metal plates made of stainless steel or the like. The first plate 18A is disposed to cover a top opening of the first chassis 12A. The second plate 18B is disposed to cover a top opening of the second chassis 12B.

As illustrated in FIG. 2 and FIG. 3, plural mounting pieces 24 are provided to protrude from outer end faces on three sides except adjacent end faces 18Aa and 18Ba of the plates 18A and 18B. Each of the mounting pieces 24 is screwed into a boss part 25 standing up from the inner surface of the chassis 12A, 12B (see FIG. 3). Thus, the plates 18A and 18B are fixed to the chassis 12A and 12B, respectively, and the display assembly 16 is fixed to the chassis 12A and 12B. The plates 18A and 18B may also be fixed to the chassis 12A and 12B by abutting and screwing up the back surfaces thereof into the boss parts 25 without using some or all of the mounting pieces 24.

In the flat plate form illustrated in FIG. 3, the plates 18A and 18B are lined up adjacent to each other in a plane direction, and the adjacent end faces 18Aa and 18Ba thereof come into contact with each other. Thus, the display 20 forms one large screen opened in the flat-plate shape. In the folded form illustrated in FIG. 1, the adjacent end faces 18Aa and 18Ba of the plates 18A and 18B are separated from each other (see FIG. 5B). In this form, the display 20 is folded, for example, in a substantially U shape.

The display 20 is, for example, a touch panel type liquid crystal display. The display 20 is a flexible display such as organic EL having a highly flexible paper structure. As illustrated in FIG. 3, the display 20 is provided across the right and left plates 18A and 18B. The display 20 has an outer shape substantially identical to the outer shape of the plates 18A and 18B in the flat plate form. As illustrated in FIG. 2 and FIG. 3, the display 20 has a first region R1, a second region R2, and a bending region R3 as a third region.

The first region R1 is a section excluding part of an adjacent region (bending region R3) along the adjacent end face 18Aa from a section in which the display 20 overlaps the first plate 18A. The first region R1 is fixed to the surface 18Ab of the first plate 18A by using the adhesive member 22. The second region R2 is a section excluding part of an adjacent region (bending region R3) along the adjacent end face 18Ba from a section in which the display 20 overlaps the second plate 18B. The second region R2 is fixed to the surface 18Bb of the second plate 18B by using the adhesive member 22. The adhesive members 22 are, for example, double-sided tape or adhesive.

Figure 5A:
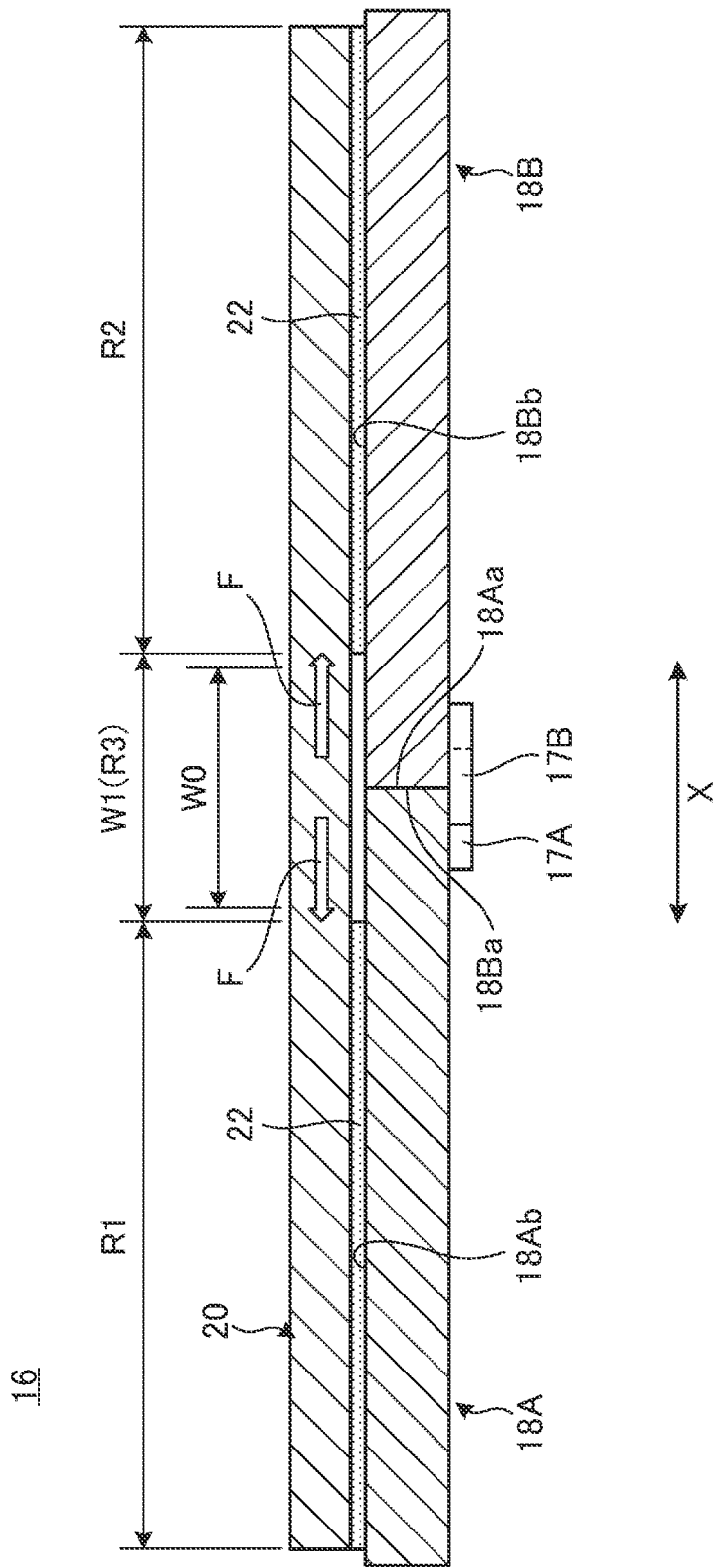
FIG. 5A is a side sectional view schematically illustrating a state of a display assembly in the flat plate form.
Figure 5B:
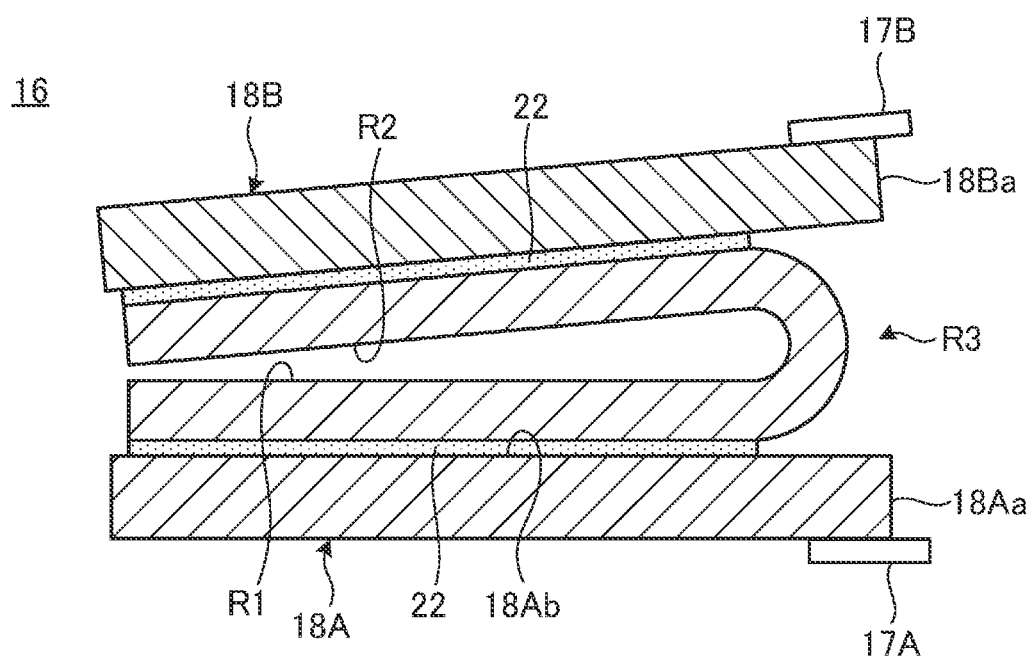
FIG. 5B is a side sectional view in a state where the display assembly illustrated in FIG. 5A is changed to the folded form.

The bending region R3 is a section to be bent when the chassis 12A and 12B are changed from the flat plate form to the folded form (see FIG. 5A and FIG. 5B). The bending region R3 is a narrow band-shaped region provided between the first region R1 and the second region R2, which is disposed to straddle the end faces 18Aa and 18Ba of the plates 18A and 18B. No adhesive member 22 is provided on the back surface 20a of the bending region R3. In other words, the bending region R3 is not fixed to the surfaces 18Ab and 18Bb of the plates 18A and 18B, which is in a state to be movable relative to the surfaces 18Ab and 18Bb.

Reference numerals 17A and 17B in FIG. 2 represent claw-shaped locking pieces, each of which protrudes from the back surface of each plate 18A, 18B toward the other plate 18B, 18A, respectively. The locking pieces 17A and 17B are so constructed that part of an upper surface of each of the locking pieces 17A and 17B on the distal end side comes into contact with the back surface of the other plate 18A, 18B in the flat plate form illustrated in FIG. 3 and the like to suppress the occurrence of a level difference between the plates 18A and 18B in order to make the surfaces 18Ab and 18Bb form a flatter plane. The locking pieces 17A and 17B may also be omitted.

Figure 4A:
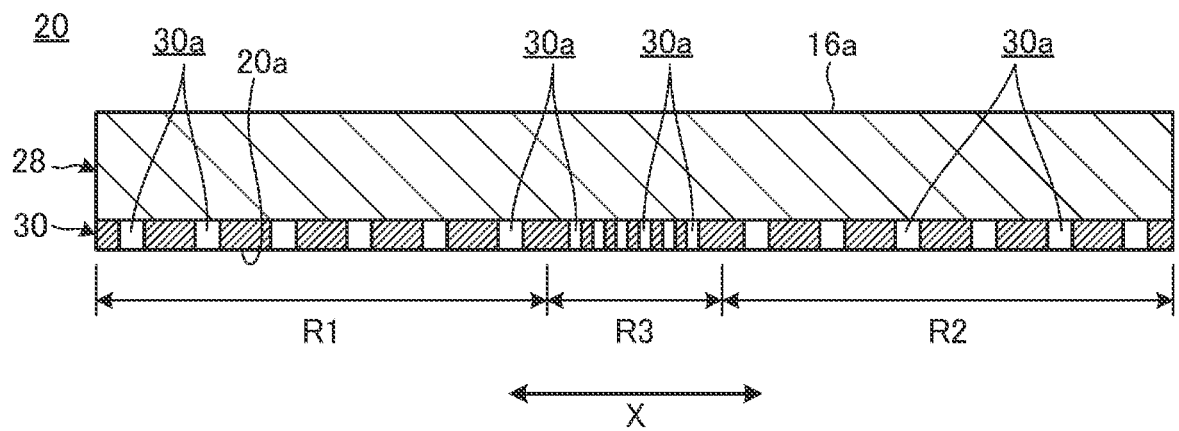
FIG. 4A is a schematic side sectional view of a display.
Figure 4B:
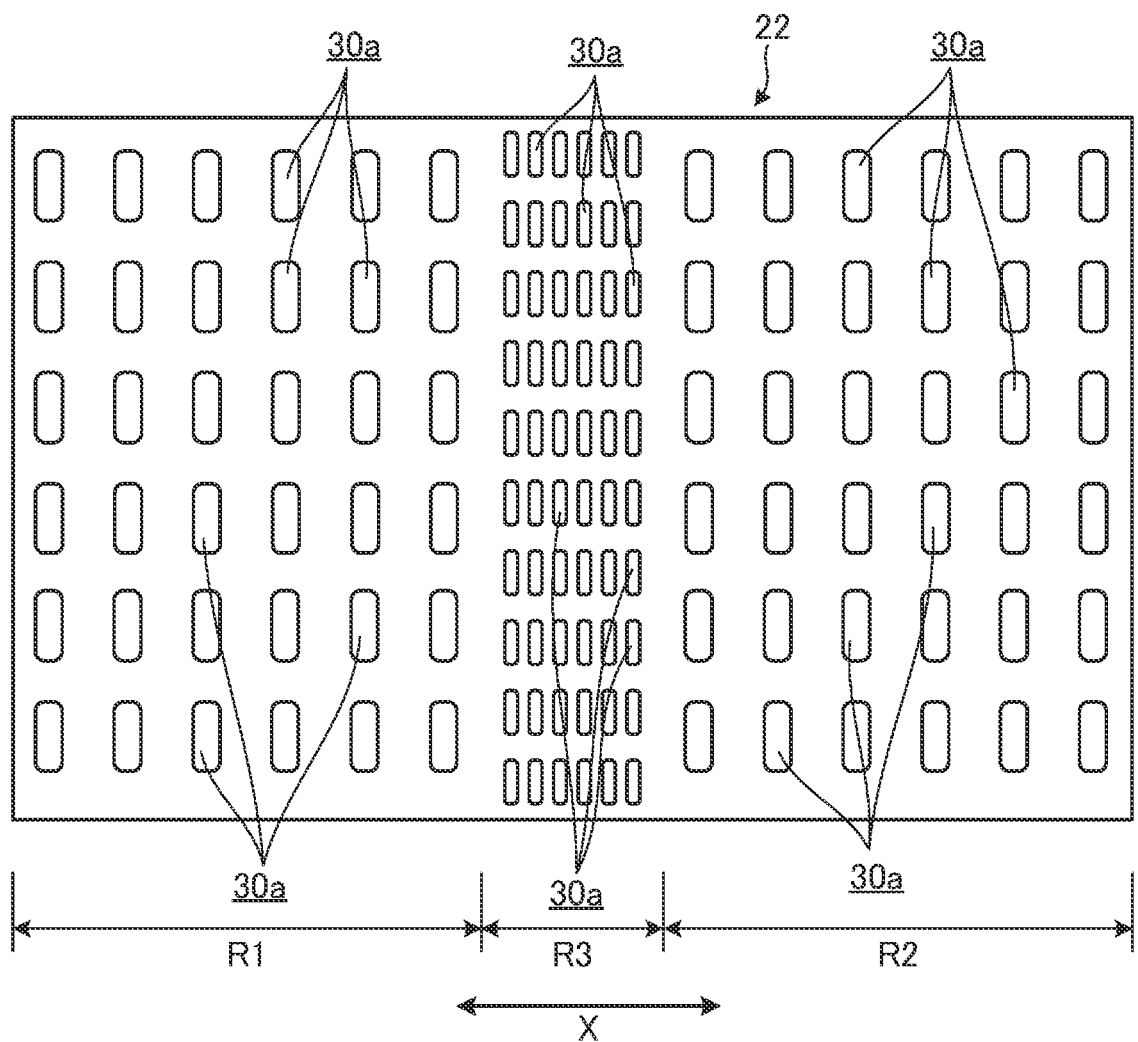
FIG. 4B is a schematic bottom view of the display illustrated in FIG. 4A.

FIG. 4A is a schematic side sectional view of the display 20. FIG. 4B is a schematic bottom view of the display 20 illustrated in FIG. 4A.

As illustrated in FIG. 4A and FIG. 4B, the display 20 according to one or more embodiments is so constructed that a sheet-shaped member 30 is laminated on the back surface of a display body 28 composed of a touch panel and a liquid crystal display unit. The surface 16a of the display body 28 forms a display surface of video and images and a touch operation surface. The sheet-shaped member 30 forms the back surface 20a of the display 20. The sheet-shaped member 30 is fixed with double-sided tape or adhesive to cover the back surface of the display body 28. The sheet-shaped member 30 is a thin sheet having flexibility. Note that sections (regions R1 and R2) other than at least the section corresponding to the bending region R3 in the display assembly 16 may be hard as long as the section corresponding to the bending region R3 is flexible.

The sheet-shaped member 30 is a metal sheet with many holes 30a formed to penetrate therethrough, such as a punching metal sheet or a mesh sheet. As illustrated in FIG. 4B, the sheet-shaped member 30 is so constructed that the opening ratio (opening area per unit area) of the holes 30a in the bending region R3 is larger than the opening ratio of the holes 30a in the regions R1 and R2. This ensures flexible bending motion of the sheet-shaped member 30 in the bending region R3. The holes 30a in the regions R1 and R2 that are not bent may be omitted, but the holes 30a are provided in these regions to reduce the weight. Further, since the opening ratio of the bending region R3 is larger than the opening ratio of the right and left regions R1 and R2, the display assembly 16 can be folded while drawing a stable U shape during bending motion. Note that the sheet-shaped member 30 may also be a sheet without the holes 30a. Further, another metal sheet without the holes 30a may be provided between the sheet-shaped member 30 and the display body 28 to construct a shield structure against electromagnetic waves.

FIG. 5A is a side sectional view schematically illustrating a state of the display assembly 16 in the flat plate form. FIG.

5B is a side sectional view in a state where the display assembly 16 illustrated in FIG. 5A is changed to the folded form.

As illustrated in FIG. 5A, the display 20 according to one or more embodiments is such that a directional tension F to be stretched outward to the right and the left in the X direction is applied to the bending region R3 in the flat plate form in which the surfaces 18Ab and 18Bb of the plates 18A and 18B are lined up in the plane direction. For example, in such a state that the display 20 is not fixed to the plates 18A and 18B, that is, in a no-loaded state, the width dimension of the bending region R3 in the X direction is denoted by W0. Then, in the flat plate form in which the display 20 is fixed to the plates 18A and 18B, and the adjacent end faces 18Aa and 18Ba of the plates 18A and 18B are in contact with each other, the width dimension of the bending region R3 becomes W1 larger than W0. In other words, in the flat plate form in FIG. 5A, where the tension F is applied to the bending region R3, the width dimension W1 as the dimension of a virtual line connecting the edge of a section on the side of the bending region R3, which is fixed to the surface 18Ab of the first plate 18A of the first region R1, and the edge of a section on the side of the bending region R3, which is fixed to the surface 18Bb of the second plate 18B of the second region R2, is larger than the width dimension W0 in the state where no tension F is applied.

Thus, the bending region R3 of the display 20 is stretched to the right and the left from the regions R1 and R2 fixed to the plates 18A and 18B in the flat plate form, and the tension F is applied thereto. As a result, when the chassis 12A and 12B are shaped into the flat plate form, the bending region R3 of the display 20 that is not fixed to the plates 18A and 18B in the display assembly according to one or more embodiments is stretched in the width direction by the tension F, suppressing the occurrence of a protruding wrinkle in this section. Further, since the bending region R3 is not fixed to the plates 18A and 18B, the display assembly 16 can change to the folded form smoothly as illustrated in FIG. 5B.

Figure 6A:
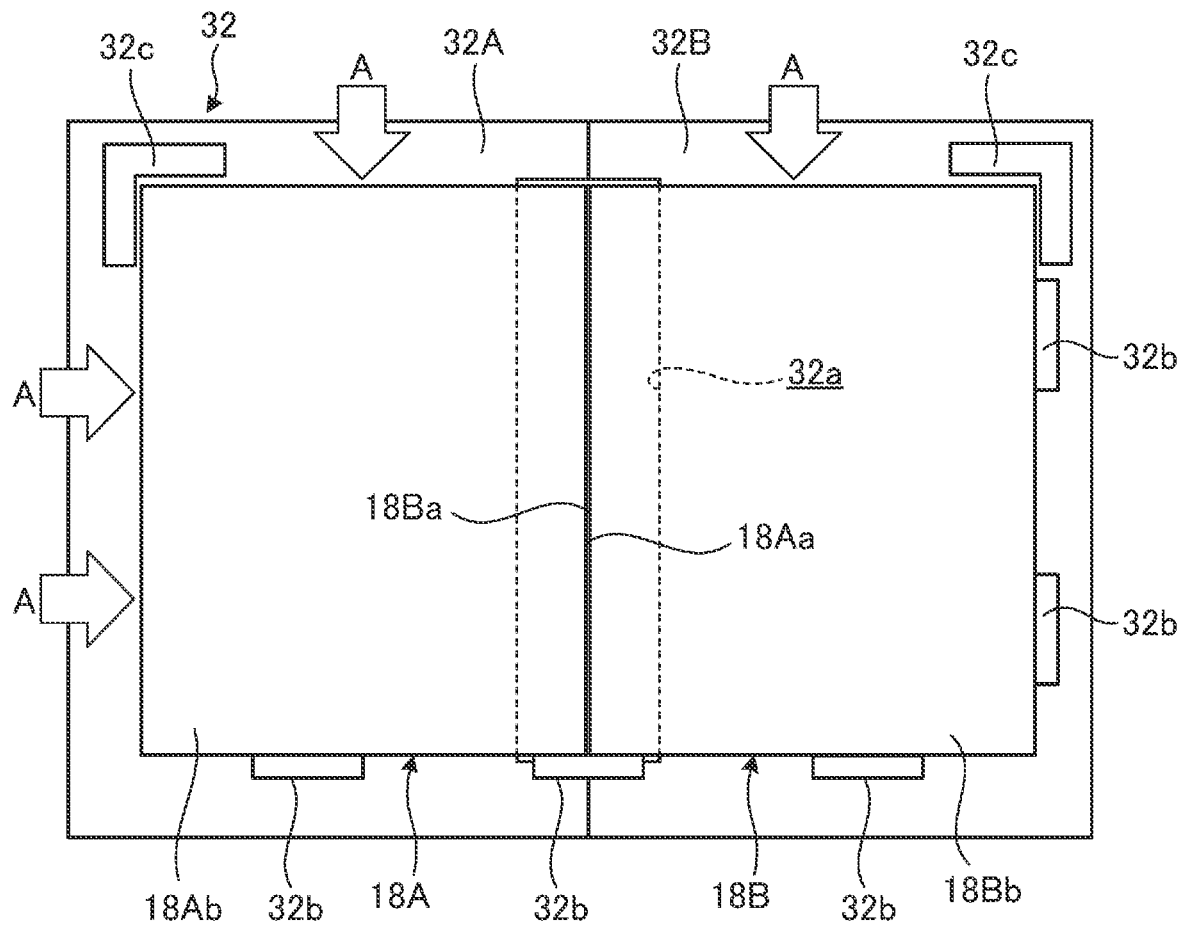
FIG. 6A is a schematic plan view in a state where a first plate and a second plate are set on a first jig.
Figure 6B:
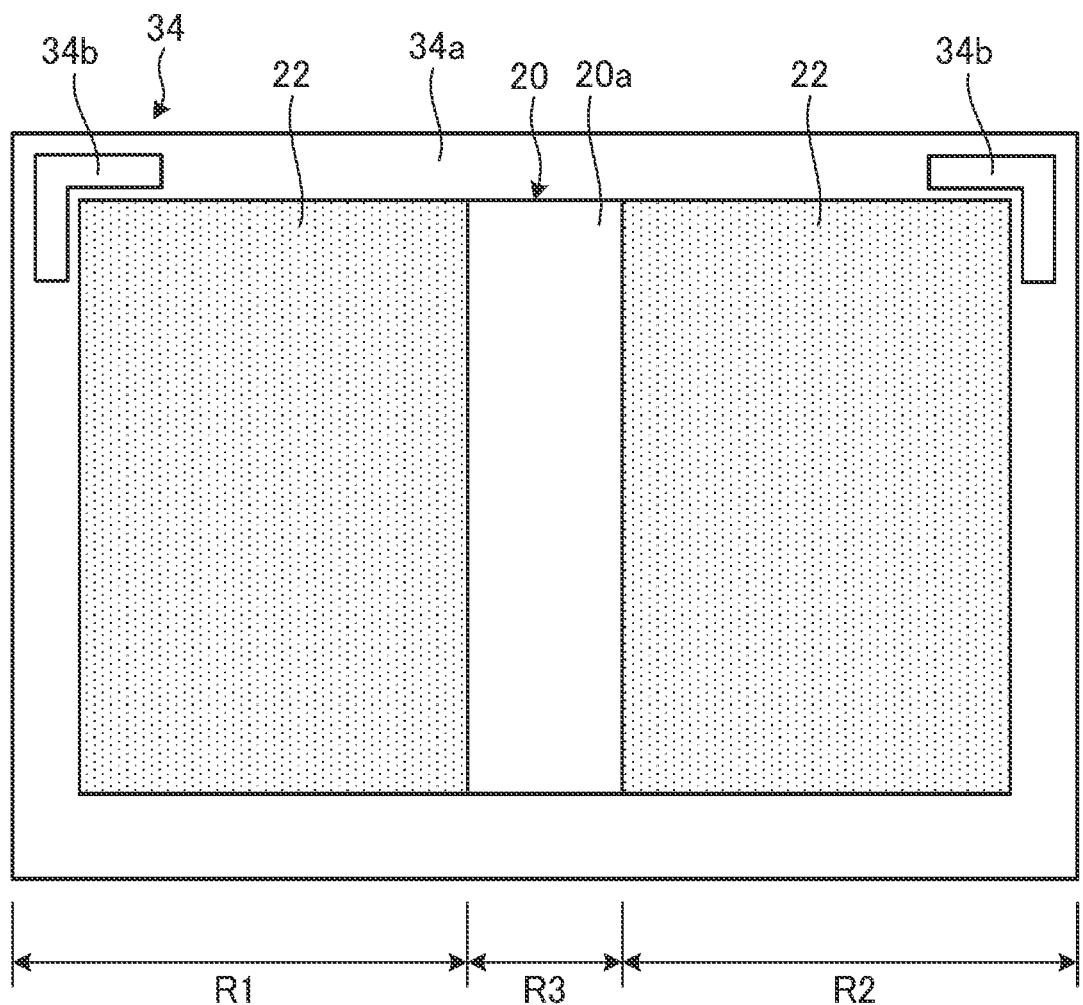
FIG. 6B is a schematic plan view in a state where the display is set on a second jig.

Next, one procedure of a manufacturing method of the display assembly 16 will be described. FIG. 6A and FIG. 6B are schematic plan views for describing the manufacturing method of the display assembly 16. FIG. 7A to FIG. 8C are schematic side sectional views for describing the manufacturing method of the display assembly 16.

Figure 7A:
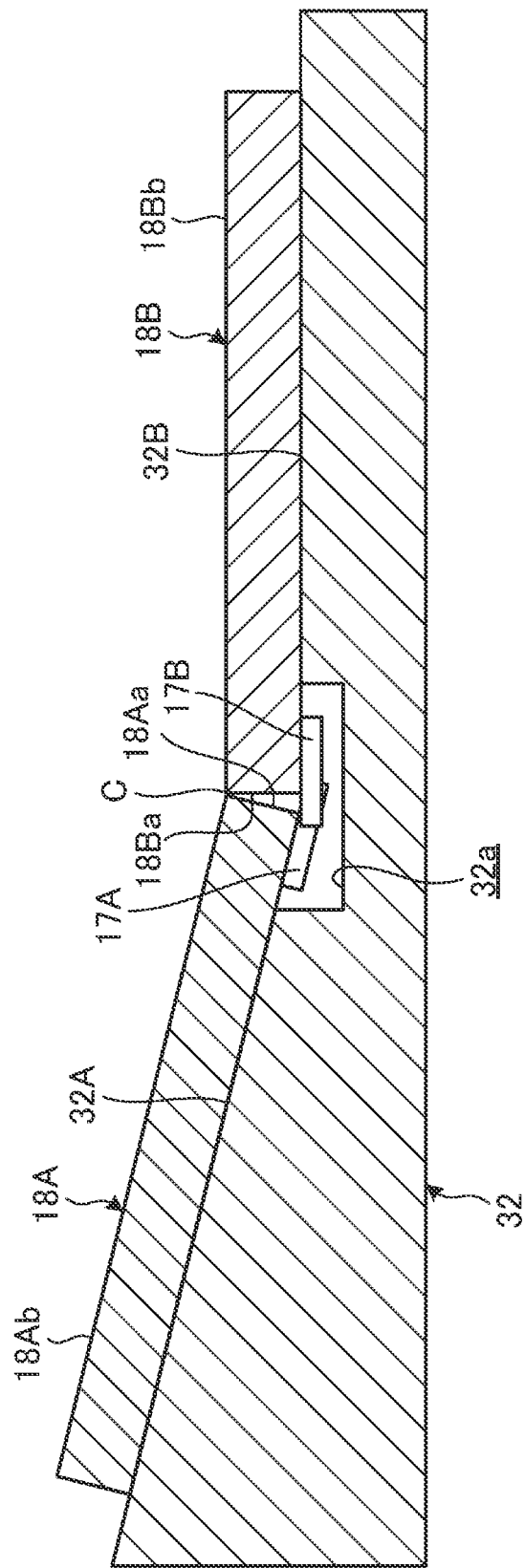
FIG. 7A is a schematic side sectional view in a state where the plates are set on the first jig.

In this manufacturing method, the plates 18A and 18B are first set on a first jig 32 (see FIG. 6A and FIG. 7A). Further, the display 20 is set on a second jig 34 (see FIG. 6B and FIG. 7B).

As illustrated in FIG. 6A and FIG. 7A, the first jig 32 is a metal plate having a substantially rectangular shape in plan view and a substantially boomerang shape in side view. The first jig 32 has a first setting surface 32A on which the back surface of the first plate 18A is set, and a second setting surface 32B on which the back surface of the second plate 18B is set. An angle of less than 180 degrees is formed between the first setting surface 32A and the second setting surface 32B. In the present embodiment, the angle between the setting surfaces 32A and 32B is in a range of about 175 to 165 degrees. It may depend on the external shape and material of the display assembly 16 to be manufactured. The angle between the setting surfaces 32A and 32B may be set in a range of about 175 to 120 degrees in consideration of the generation of a sufficient tension F and the stability of the plates 18A and 18B on the setting surfaces 32A and 32B.

The first jig 32 has a recessed portion 32a at the boundary between the setting surfaces 32A and 32B to extend along the adjacent end faces 18Aa and 18Ba. The recessed portion 32a is a clearance groove to prevent the locking pieces 17A and 17B from interfering with the first jig 32.

Plural stopper members 32b and a pair of camera units 32c, 32c are provided on the setting surfaces 32A and 32B. The stopper members 32b are metal blocks used to position the outer peripheral end faces of the plates 18A and 18B. The stopper members 32b are used to position the lower end faces of the plates 18A, 18B and the right end face of the plate 18B in FIG. 6A to position the plates 18A and 18B at a predetermined setting position. Each camera unit 32c includes two cameras disposed to be orthogonal to each other across the corner of each of the plates 18A and 18B, respectively. The two cameras of one camera unit 32c can capture images of the left side of the first plate 18A in FIG. 6A (the side opposite to the side of the adjacent end face 18Aa) and the upper side of the first plate 18A in FIG. 6A in the vertical direction, respectively. The two cameras of the other camera unit 32c can capture images of the right side of the second plate 18B in FIG. 6A (the side opposite to the side of the adjacent end face 18Ba) and the upper side of the second plate 18B in FIG. 6A in the vertical direction, respectively. Thus, each camera unit 32c can read the position of the corner of each plate 18A, 18B with high accuracy. Note that an air compressor is installed to blow predetermined air A from the upper side and the left side in FIG. 6A, where no stopper members 32b are provided on the first jig 32, to the peripheral end faces of the plates 18A and 18B. Thus, the first jig 32 can easily position the plates 18A and 18B, and can eliminate the gap between mating faces (the adjacent end faces 18Aa and 18Ba) of the plates 18A and 18B.

When the plates 18A and 18B are set on the first jig 32, the surfaces 18Ab and 18Bb thereof are retained at the same angle as the angle formed between the setting surfaces 32A and 32B as illustrated in FIG. 7A. In other words, the adjacent end faces 18Aa and 18Ba of the plates 18A and 18B become such a state that the surfaces 18Ab and 18Bb come into contact with each other and the back surfaces are separated from each other at corner C. In the present embodiment, unillustrated fine air suction holes are formed through the setting surfaces 32A and 32B. In other words, the first jig 32 can suck air from the air suction holes in the state where the plates 18A and 18B are set on the setting surfaces 32A and 32B to retain the plates 18A and 18B on the setting surfaces 32A and 32B.

Figure 7B:
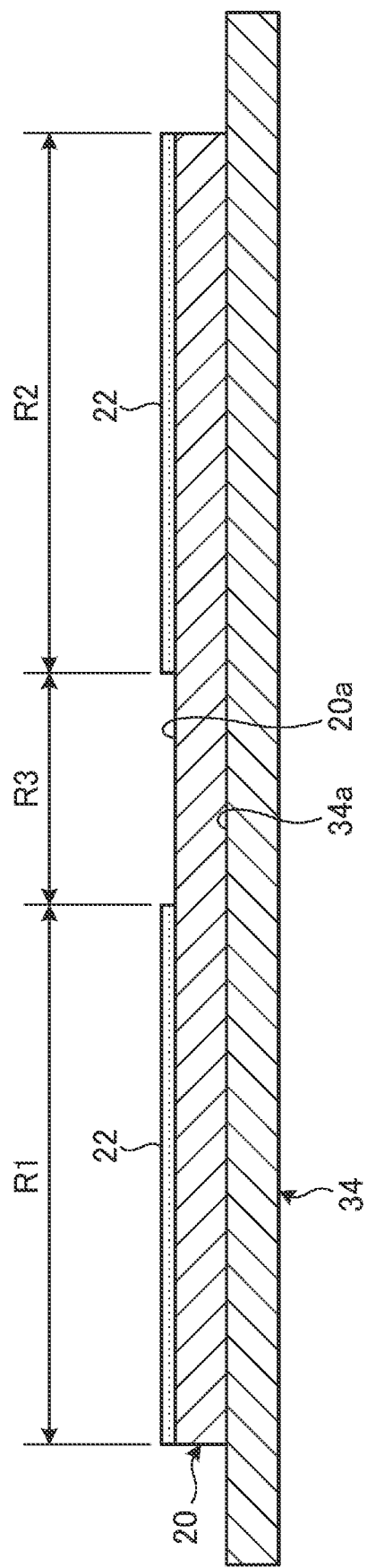
FIG. 7B is a schematic side sectional view in a state where the display is set on the second jig.

As illustrated in FIG. 6B and FIG. 7B, the second jig 34 is a rectangular plate formed of rubber or resin having flexibility. The second jig 34 has an outer shape substantially identical to the outer shape of the first jig 32. The second jig 34 has a setting surface 34a on which the display 20 is set. A pair of camera units 34b, 34b are provided on the setting surface 34a. Each camera unit 34b has a structure similar to each camera unit 32c of the first jig 32 to have two cameras, respectively. Thus, each camera unit 34b can read the position of each corner of the display 20 with high accuracy.

When the display 20 is set on the second jig 34, the back surface 20a thereof is in a state of facing up as illustrated in FIG. 7B. The adhesive members 22 are applied to the regions R1 and R2 of this back surface 20a. Fine air suction holes are also formed through the setting surface 34a in a manner similar to those formed through the setting surfaces 32A and 32B of the first jig 32 to be able to retain the display 20.

Figure 8A:
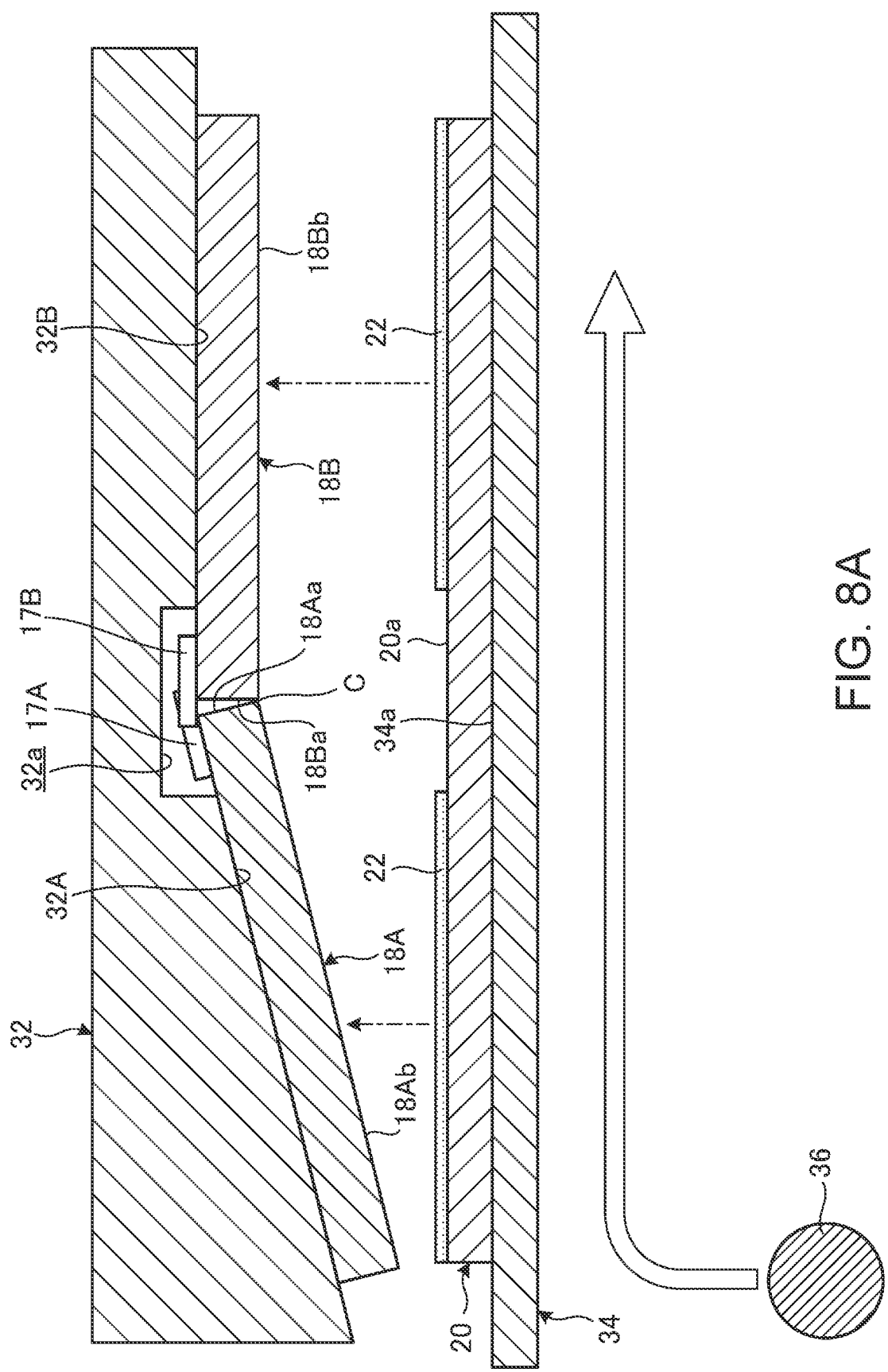
FIG. 8A is a side sectional view schematically illustrating the operation of pasting the display set on the second jig onto the plates set on the first jig.

Next, the display 20 set on the second jig 34 is pasted onto the plates 18A and 18B set on the first jig 32. In this process, the first jig 32 on which the plates 18A and 18B are set is first turned upside down to orient the plates 18A and 18B downward as illustrated in FIG. 8A. Then, the second jig 34 is placed below the first jig 32 in such a manner that the adhesive members 22 applied to the back surface 20a of the display 20 face the surface 18Ab and 18Bb of the plates 18A and 18B. At this time, the jigs 32 and 34 are aligned with each other by using the respective camera units 32c, 34b to align a total of two corners of the plates 18A and 18B with corresponding two corners of the display 20 with high accuracy.

Figure 8B:
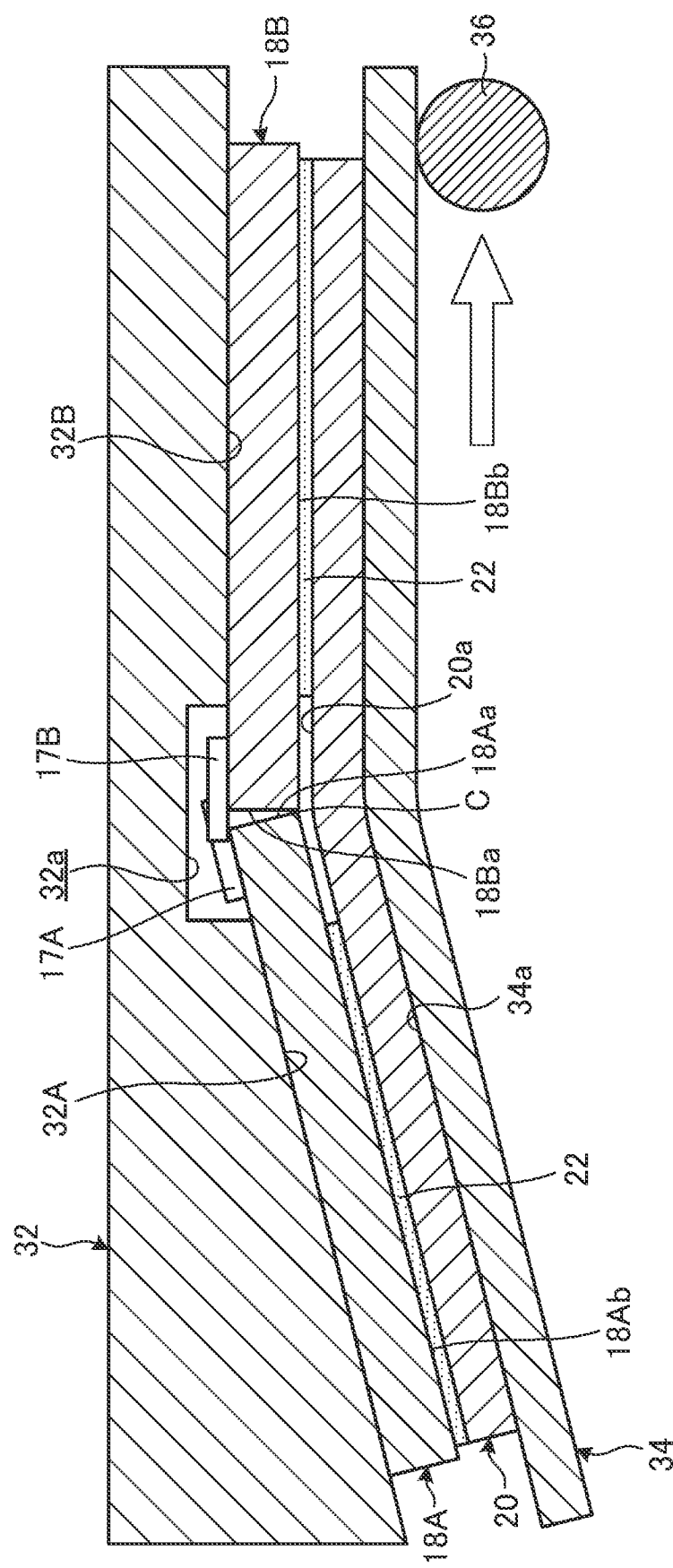
FIG. 8B is a side sectional view schematically illustrating a state where the display is pasted on the plates from the state illustrated in FIG. 8A.

Then, the second jig 34 is raised up to paste the back surface 20a of the display 20 to the surfaces 18Ab and 18Bb of the plates 18A and 18B through the adhesive members 22 as illustrated in FIG. 8B. At this time, a pressing roller 36 rolling along the line-up direction of the plates 18A and 18B is pressed from the back surface of the second jig 34. This enables the display 20 to be pasted on the plates 18A and 18B reliably without causing air entrainment and the like in adhesive sections by the adhesive members 22. As a result, the display 20 is fixed to the plates 18A and 18B to form the display assembly 16 having an angle of less than 180 degrees between the plates 18A and 18B.

Note that the process of pasting the display 20 onto the plates 18A and 18B may also use a method of pressing the second jig 34 inverted from top to bottom while keeping the plates 18A and 18B upward without turning the first jig 32 upside down. However, since the second jig 34 and the display 20 set thereon are flexible, the method of pressing the pressing roller 36 while applying the second jig 34 to the plates 18A and 18B from below, rather than from above, can paste the display 20 more neatly.

Next, air suction from the air suction holes through the setting surfaces 32A, 32B, and 34a of the first jig 32 and the second jig 34 is stopped, and the manufactured display assembly 16 is removed from the jigs 32 and 34. Then, the display assembly 16 set at the angle between the setting surfaces 32A and 32B (see FIG. 8C) is changed to the flat plate form illustrated in FIG. 5A. At this time, the center of rotation between the right and left plates 18A and 18B is located at the corner C of the adjacent end faces 18Aa and 18Ba that are in contact with each other at the end of production illustrated in FIG. 8B. Therefore, the tension F is applied to the display 20 located on the inside (on the upper side in FIG. 8C) of this rotation center (corner C) in the direction of rotation upon changing from FIG. 8C to FIG. 5A. As a result, the production of the display assembly 16 having such a structure that the tension F is applied to the bending region R3 in the flat plate form illustrated in FIG. 5A is completed.

As described above, in the display assembly 16 according to one or more embodiments, when the plates 18A and 18B are shaped into the flat plate form, the tension F is applied to the bending region R3 to stretch the bending region R3 in the width direction. Therefore, the display assembly 16 can suppress the bending region R3 from lifting up or being wrinkled when the chassis 12A and 12B are open when using the portable information device 10 in which this display assembly 16 is incorporated, thereby improving visibility and appearance quality. Further, in the manufacturing method mentioned above, since the plates 18A and 18B are opened at 180 degrees after the display 20 is pasted on the plates 18A and 18B set at the angle of less than 180 degrees, the display assembly 16 in which the tension F is applied to the bending region R3 can be manufactured efficiently.

Figure 8C:
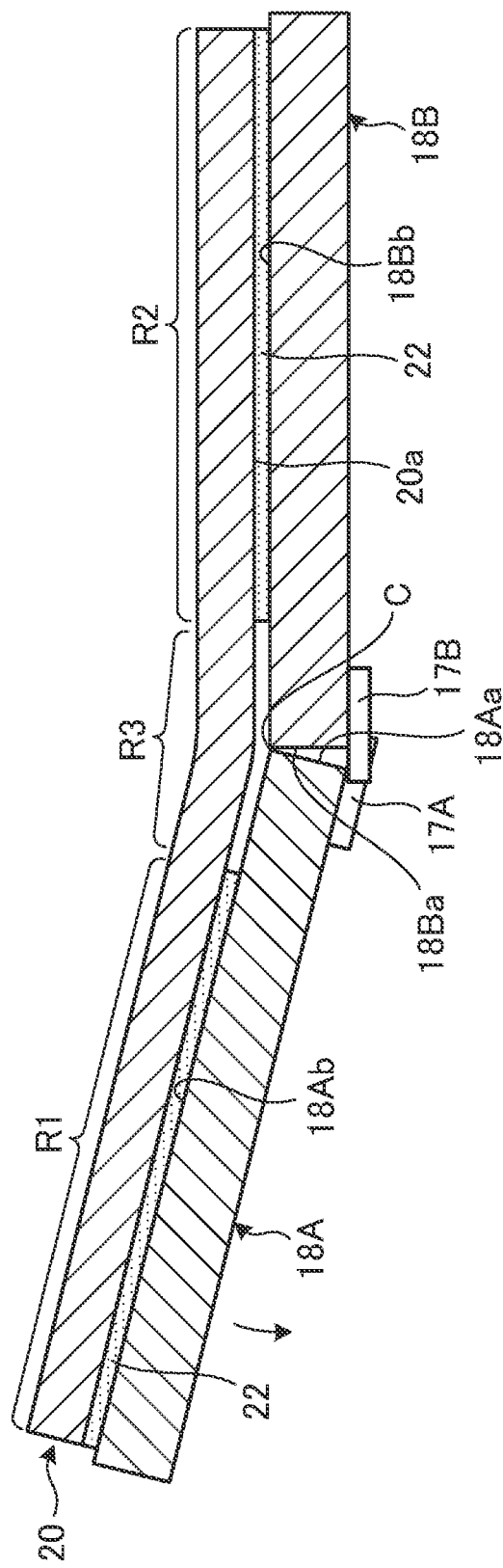
FIG. 8C is a side sectional view schematically illustrating a state where the display assembly illustrated in FIG. 8B is removed from the jigs.

Incidentally, the tensile ratio when the bending region R3 is stretched from the width dimension (W0) at the end of production illustrated in FIG. 8B and FIG. 8C to the width dimension (W1) in the flat plate form illustrated in FIG. 5A may be determined in consideration of wrinkle suppression and suppression of damage to the display 20 by excessive tension. The adhesive members may be applied thinly to reduce the level difference from a central section of the display 20 where there is no adhesive member 22. Since there is a risk of peeling off the adhesive members if the display 20 is pulled strongly, the tensile ratio may be determined in further consideration of peeling prevention of the adhesive members.

FIG. 9 is a table of experimental data indicative of the width dimension W1 (mm) of the bending region R3 in the flat plate form, and evaluation results when the tensile amount (mm) as an actually stretched distance of the width dimension W1 from the width dimension W0 before the application of tension, that is, the tensile ratio (%) as a stretching rate from the width dimension W0 to the width dimension W1 is changed.

In this experiment, as illustrated in FIG. 9, the width dimension W1 of the bending region R3 is set to 15 (mm), and the tensile amount (mm) is changed appropriately with respect to this width dimension W1 to comprehensively evaluate the wrinkle suppression effects and damages to the display 20.

First, when the tensile amount was set to 0.05 (mm), that is, when the tensile ratio was set to 0.33(%), some wrinkle suppression effect was obtained but the wrinkle suppression effect was less than other results. Therefore, the tensile ratio of 0.33(%) was evaluated as possible (triangle).

Next, when the tensile amount was set to 0.1 (mm) or more, that is, when the tensile ratio was set to 0.67(%) or more, a sufficient wrinkle suppression effect was confirmed under either condition. However, the tensile ratio may be minimized from the viewpoint of damage prevention to the display 20. Therefore, the condition of the lowest tensile ratio of 0.67(%) among the results from which high wrinkle suppression effects were obtained was evaluated as best (double circle). As for the conditions of tensile ratios of 1.33(%) to 2.67(%), since it is considered that damage to the display 20 can be sufficiently suppressed, the conditions were evaluated as good (single circle). On the other hand, as for the condition of a tensile ratio of 3.33(%), since damage to the display 20 is concerned due to excessive tension, the condition was evaluated as possible (triangle).

Of course, since the maximum tensile ratio that takes no damage varies depending on the specifications and structure of the display 20, the two conditions evaluated as possible (triangle) are also sufficiently useful from the viewpoint of wrinkle suppression compared with such a conventional condition that no tension is applied. Thus, it was found from the experimental results that both the wrinkle suppression effect and the damage suppression effect on the display can be achieved by setting the tensile ratio of the bending region R3 of the display 20 in the display assembly 16 in a range of at least 0.3(%) to 3.3(%) (the second decimal place is truncated from the results in FIG. 9).

Note that even when the tensile ratio of the bending region R3 is less than 0.33(%), it can be put to practical use sufficiently depending on the specifications and structure of the display 20 because the wrinkle suppression effect is confirmed compared with the conventional case of tensile ratio of 0(%). Similarly, since the tensile limit of the display 20 varies depending on the specifications and structure thereof, such a case that the tensile ratio is greater than 3.33% can also be put to practical use sufficiently depending on the specifications and structure of the display 20.

In the manufacturing method using the jigs 32 and 34 mentioned above, the tensile ratio can be adjusted easily to a desired value by adjusting the angle between the setting surfaces 32A and 32B of the first jig 32.

Note that the sheet-shaped member 30 is provided on the back surface of the display body 28 in the display assembly 16 according to one or more embodiments. Then, the opening ratio of the holes 30a in this sheet-shaped member 30 is different between the section corresponding to the bending region R3 and the other sections. In other words, the section corresponding to the bending region R3 has a structure more flexible than the other sections in the sheet-shaped member 30. Therefore, in the display assembly 16, the bending region R3 is much easier to lift up or be wrinkled due to changes in the rigidity of the sheet-shaped member 30. In this respect, since the tension F is applied to the bending region R3 in the display assembly 16, the occurrence of wrinkles can be suppressed even in the structure provided with the sheet-shaped member 30.

Figure 10A:
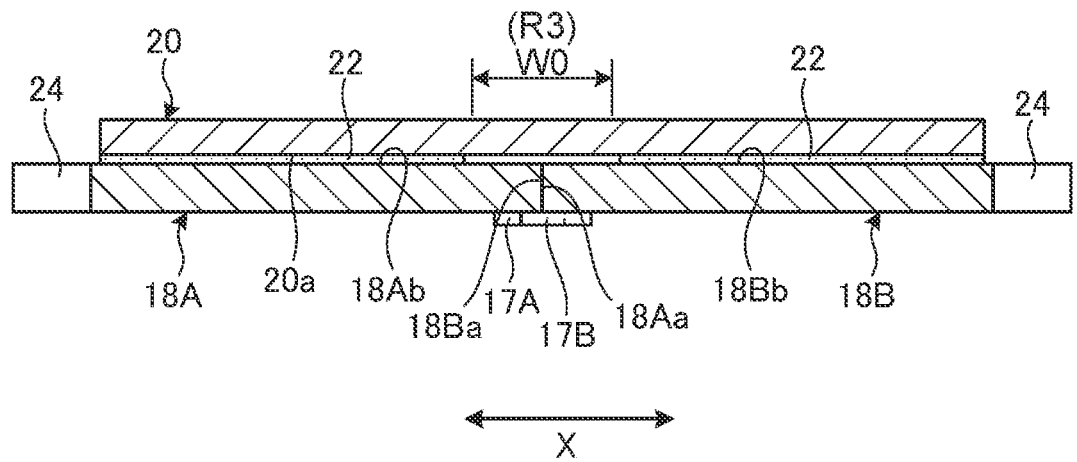
FIG. 10A is a side sectional view schematically illustrating the display assembly used in a manufacturing method according to a modification.
Figure 10B:
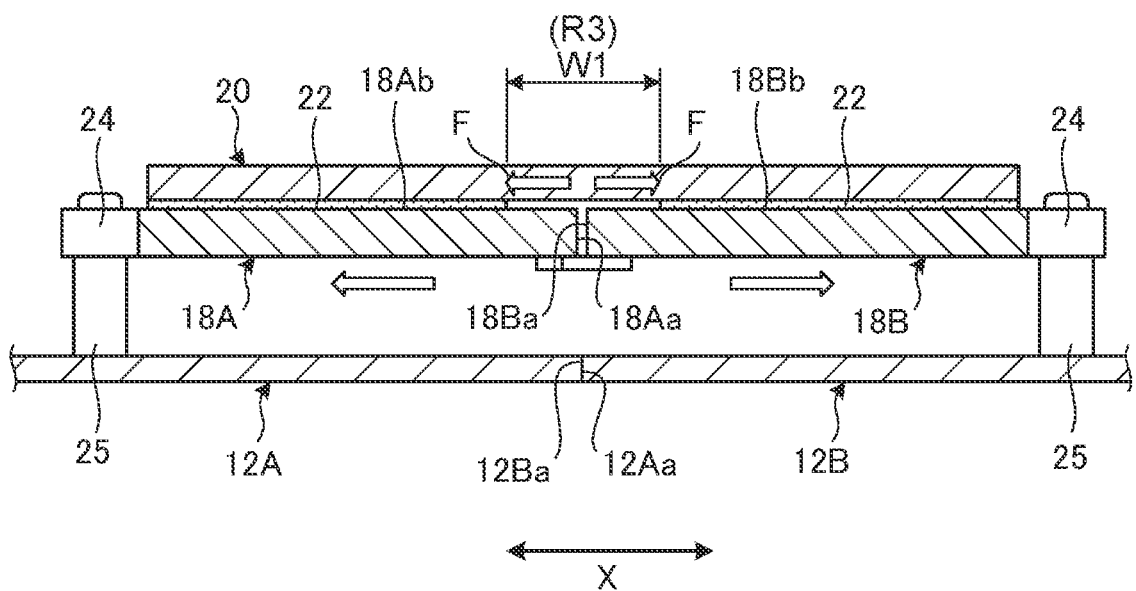
FIG. 10B is a schematic side sectional view illustrating a state where the display assembly illustrated in FIG. 10A is attached to chassis by the manufacturing method according to the modification.

Next, a manufacturing method of the display assembly 16 according to a modification will be described. FIG. 10A is a side sectional view schematically illustrating the display assembly 16 used in the manufacturing method according to the modification. FIG. 10B is a schematic side sectional view illustrating a state where the display assembly 16 illustrated in FIG. 10A is attached to the chassis 12A and 12B by the manufacturing method according to the modification.

In this manufacturing method, the adjacent end faces 18Aa and 18Ba are first brought into contact with each other as illustrated in FIG. 10A, and the plates 18A and 18B are set on a predetermined jig in the flat plate form in which the surfaces 18Ab and 18Bb are lined up in the plane direction. Then, the display 20 is pasted onto the plates 18A and 18B by using the adhesive members 22. Thus, the display assembly 16 is manufactured. Note, however, that no tension F is applied to the bending region R3 in this display assembly 16 alone.

Therefore, the display assembly 16 illustrated in FIG. 10A is next attached to the chassis 12A and 12B as illustrated in FIG. 10B. In this case, screw holes of the boss parts 25 of the chassis 12A and 12B are placed in positions slightly offset to the outside with respect to screw holes of the mounting pieces 24 of the display assembly 16 in the X direction (directions away from the adjacent end faces 18Aa and 18Ba, respectively). In other words, the pitch between the right and left boss parts 25, 25 in FIG. 10B is wider than the pitch between the right and mounting pieces 24, 24 in FIG. 10A. Therefore, when the display assembly 16 is screwed into the chassis 12A and 12B, the plates 18A and 18B are stretched in a direction to be separated from each other.

As a result, when the display assembly 16 is attached to the chassis 12A and 12B, a gap is formed between the adjacent end faces 18Aa and 18Ba, and the tension F is applied to the bending region R3. This suppresses the occurrence of wrinkles in the bending region R3. In other words, in the display assembly 16 used in this manufacturing method, the width dimension of the bending region R3 is W0 before being attached to the chassis 12A and 12B, and W1 after being attached.

In this manufacturing method, however, when the portable information device 10 is in the flat plate form, since such a region as not to be supported by the plates 18A and 18B is formed at the center of the back surface 20a of the display 20, the support rigidity of the display 20 is lowered. In this respect, since the display assembly 16 manufactured by the manufacturing method illustrated in FIG. 7A to FIG. 8C mentioned above is such that the adjacent end faces 18Aa and 18Ba of the plates 18A and 18B are in contact with each other in the flat plate form, it is possible to fully support the display 20.

Note that the present invention is not limited to the aforementioned embodiment, and changes can, of course, be made freely without departing from the scope of the present invention.

In the above, the portable information device 10 foldable in half like a book is illustrated. However, in addition to the structure in which the same shaped chassis are folded in half, the present invention can also be applied to various structures, such as a double-door structure in which two small-sized chassis are coupled to the right and left edges of a large-sized chassis in a foldable manner, an S-shaped folding structure in which two chassis different in folding direction from each other are coupled to the right and left edges of one chassis, and a J-shaped folding structure in which a small-sized chassis is coupled to one of the right and left edges of a large-sized chassis in a foldable manner, and the number of coupled chassis may be four or more.

DESCRIPTION OF SYMBOLS 10 portable information device
12A first chassis
12B second chassis
16 display assembly
18A first plate
18B second plate
20 display
28 display body
30 sheet-shaped member
32 first jig
34 second jig Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A display assembly comprising:
   a first plate;
   a second plate disposed adjacent to the first plate; and
   a display formed into one sheet shape and that comprises:
      a first region fixed to a first surface of the first plate;
      a second region fixed to a second surface of the second plate; and
      a third region as a region between the first region and the second region, wherein
   the third region is disposed to straddle adjacent end faces of the first plate and the second plate and to be bendable without being fixed to the first surface and the second surface,
   the display assembly comprises:
      a flat plate form in which the first surface and the second surface are lined up in a plane direction to be formed into a flat-plate shape; and
      a folded form in which the third region is so bent that the first surface and the second surface face each other,
   in the flat plate form, a tension is applied to the third region in a width direction toward the first region and the second region, a sheet-shaped member is disposed on a back surface of the display and includes a plurality of holes disposed in the first region, the second region, and the third region, and the sheet-shaped member is so formed that an opening ratio of the holes in the third region is larger than an opening ratio of the holes in the first region and the second region.

2. The display assembly according to claim 1, wherein a dimension of the third region in the width direction in a state of being applied with the tension is stretched by 0.3% or more with respect to a dimension of the third region in a state of being not applied with the tension.

3. The display assembly according to claim 1, wherein a dimension of the third region in the width direction in a state of being applied with the tension is stretched in a range of less than 3.3% with respect to the dimension of the third region in the width direction in the state of being not applied with the tension.

4. The display assembly according to claim 1, wherein the adjacent end faces of the first plate and the second plate come into contact with each other in the flat plate form.

5. A manufacturing method of a display assembly, comprising:

setting a first plate and a second plate on a jig in a state of being adjacent to each other to retain a first surface of the first plate and a second surface of the second plate in an angular posture of less than 180 degrees; and fixing:
a first region of a display, formed into one sheet shape, to the first surface; and
a second region of the display to the second surface, wherein a third region between the first region and the second region of the display is disposed in a position to straddle adjacent end faces of the first plate and the second plate without being fixed to the first surface and the second surface, a sheet-shaped member is disposed on a back surface of the display and includes a plurality of holes disposed in the first region, the second region, and the third region, the sheet-shaped member is so formed that an opening ratio of the holes in the third region is larger than an opening ratio of the holes in the first region and the second region, and the fixing of the first region and the second region of the display includes fixing the sheet-shaped member disposed on the back surface of the display to the first surface and the second surface, respectively.

6. The manufacturing method according to claim 5, wherein in a state where the first surface and the second surface set on the jig are oriented downward, the fixing causes the display to be moved from down to up and fixes the display to the first plate and the second plate.

7. A manufacturing method of a portable information device, comprising:

fixing a first region of a display, formed into one sheet shape, to a first surface of a first plate, and fixing a second region of the display to a second surface of a second plate adjacent to the first plate, wherein a third region between the first region and the second region of the display is disposed in a position to straddle adjacent end faces of the first plate and the second plate without being fixed to the first surface and the second surface; and attaching the first plate to a first chassis and attaching the second plate to a second chassis adjacent to the first chassis and coupled rotatably to the first chassis, wherein the attaching attaches the second plate to the second chassis in a state of applying, to the third region, a tension in a width direction toward the first region and the second region after attaching the first plate to the first chassis, a sheet-shaped member is disposed on a back surface of the display and includes a plurality of holes disposed in the first region, the second region, and the third region, the sheet-shaped member is so formed that an opening ratio of the holes in the third region is larger than an opening ratio of the holes in the first region and the second region, and the fixing of the first region and the second region of the display includes fixing the sheet-shaped member disposed on the back surface of the display to the first surface and the second surface, respectively.

* * * * *